July 1, 1930.  T. ROSSKOPF  1,769,073
MEANS FOR TRANSFORMING POLYPHASE ALTERNATING CURRENT
INTO SINGLE PHASE ALTERNATING CURRENT
Filed April 27, 1926
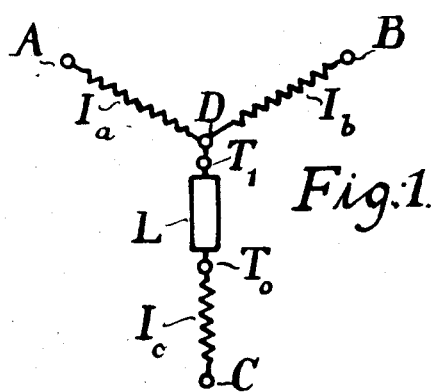
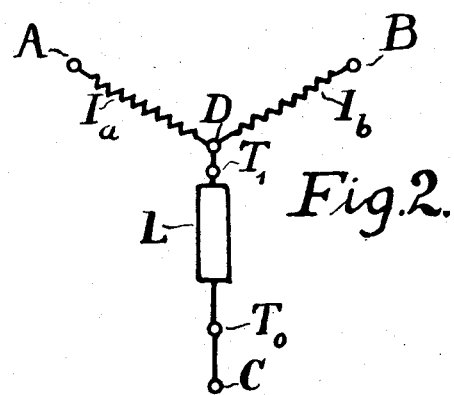
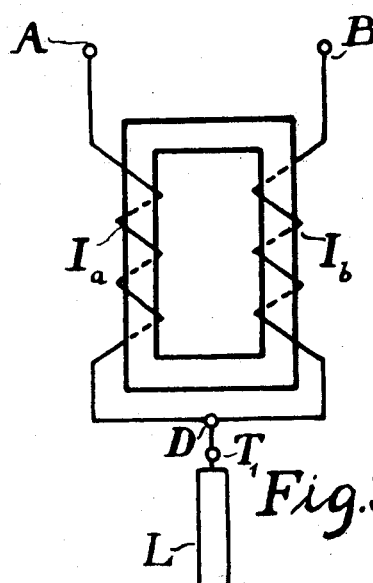
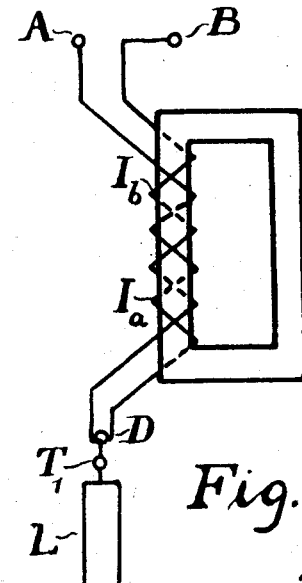
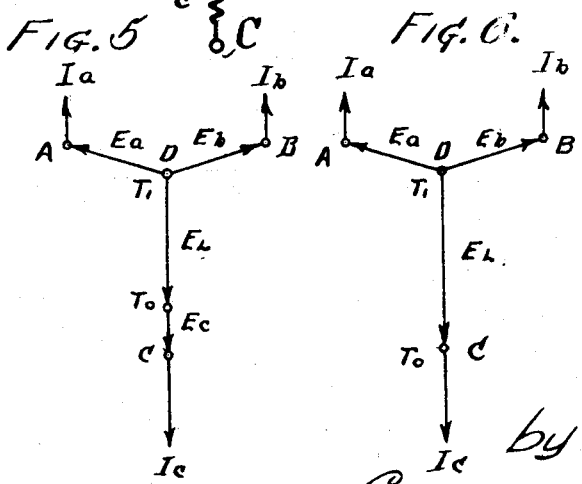
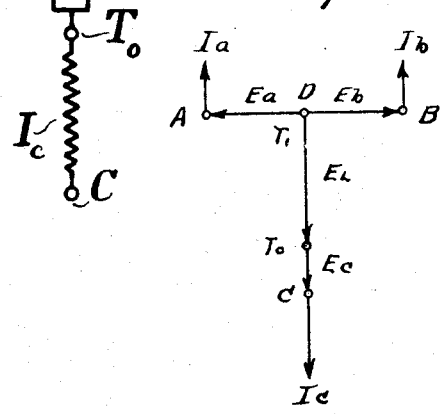
Inventor
T. Rosskopf
by
Langner Parry Card & Langner
Attorneys.

Patented July 1, 1930

1,769,073

UNITED STATES PATENT OFFICE

THOMAS ROSSKOPF, OF ANNASTRAAT NIJMEGEN, NETHERLANDS, ASSIGNOR TO ELECTRIC ARC CUTTING AND WELDING COMPANY, OF NEWARK, NEW JERSEY

MEANS FOR TRANSFORMING POLYPHASE ALTERNATING CURRENT INTO SINGLE-PHASE ALTERNATING CURRENT

Application filed April 27, 1926, Serial No. 105,030, and in the Netherlands January 8, 1925.

This invention relates to means for transforming polyphase alternating current into single phase alternating current, and more particularly for transforming two or three phase alternating current into single phase alternating current. The invention is especially directed to means for operating a single phase apparatus, such for example, but not by way of limitation, as a single phase arc welding machine from a polyphase alternating current system, whereby the distribution of the load on the different phases, is greatly improved over any other scheme of which I am aware.

The invention comprises the coupling of impedances between the polyphase system and the single phase system. In Holslag Patent 1,305,360, issued June 3rd, 1919, specially designed transformers have been proposed, but according to my present invention, I operate a single phase apparatus from a polyphase system, for example a three phase system, by connecting two preferably equal impedances, which can be called a divisor, between two of the lines of the three phase system, and then connecting the single phase apparatus at the central point of this divisor, or at the junction of the said two impedances, and preferably to a third impedance, the opposite terminal of which is connected to the other line of the three phase system. By this arrangement it will be readily seen that the potential at the junction of the first two mentioned impedances when equal is one half that, existing between the two lines connected to the extremities or free ends of these impedances, and that the potential between this central point of the divisor and the line wire of the third phase will be the vector sum of the potentials on both legs of the divisor, for example if the potential across the phases is 220 volts, then the potential will be 110 volts at the junction of the first two impedances, or the center of the divisor, and from this point to the other phase, the potential, being the vector sum of two potentials of 110 volts acting at 120 degrees apart will be 190 volts; hence it will be clear that it is desirable to use a third impedance connected between the third phase and one terminal of the single phase apparatus which may be operated at 110 volts, and by taking taps from the third impedance, the voltage across the single phase apparatus can be very nicely regulated. Preferably the magnetic circuits of the impedances constituting the said divisor are so arranged that they are not substantially coupled with any other windings other than themselves, for reasons which will be hereinafter set forth.

When the details of the arrangement are combined in one construction, it cannot in practice be avoided, that some magnetic leakage shall cause a coupling such as is not required according to this invention. Thus it is stated as set forth above, that the first and second impedances are substantially not coupled with windings not belonging to them.

According to the invention the first and the second impedances can be coupled magnetically for opposing to each other the magneto motive forces due to the load currents through their windings.

According to another feature of the invention the magnetic coupling of the first and second impedance is arranged for forming a low leakage—co-efficient between the windings of the two impedances.

According to another feature of the invention the polyphase system comprises a three-wire system.

According to another feature of the invention the first and the second impedances are connected in circuit between two lines of a three-phase system and one line of a single phase consumer system, the other line of the consumer system being connected through a third impedance to a third line of the three-phase system.

According to another feature of the invention two impedances are connected in circuit between two lines of a three-phase system and one line of a single phase consumer system, the first and the second impedances being so coupled magnetically that the magneto motive forces of the load currents in the windings of these impedances are opposed to each other, and a third impedance connected between the other line of the single phase system and a third line of the three-phase system. In this arrangement the first and second impedances have a magnetic circuit which is substantially not coupled with windings not belonging to the first and second impedances.

According to another feature of the invention the magnetic coupling of the first and second impedance is arranged for forming a low leakage co-efficient between the windings of the impedances.

According to another feature of the invention the single phase consumer system includes a single phase transformer such as shown in Holslag Reissue Patent 16,012, March 3, 1925.

According to still another feature of the invention the third impedance has practically a value of zero, so that the single phase consumer system is connected directly between a point of the electric circuit to which the first and second impedances are connected, and a third line of the polyphase system.

With these general statements of the objects and purposes of the invention, I will now proceed to describe several embodiments of the same for showing the manner in which the invention can be carried out. It is to be understood that while there are described what may be considered as preferred embodiments, these do not limit the invention to the precise conditions and proportions set forth since they may be varied in accordance with the particular purposes for which they are intended and the conditions under which they are to be utilized.

Some advantages of the invention can be explained by the following: The described arrangements are of great importance in the case that a single phase system is required having a comparatively high voltage drop, as for example, is necessary in systems for electric arc welding.

In these systems an impedance is often used to give the required relation between the voltage and current, and by making use of more than one impedance, and by connecting the impedances as described above, the same result as regards the voltage drop can be obtained and furthermore the system can be fed from a polyphase supply system and more particularly from a two or three phase system.

The first and second impedances which are connected in circuit between two lines of the polyphase system and one line of the single phase system, can be magnetically coupled for thus reducing the voltage drop in the single phase system.

Furthermore the magnetic coupling as mentioned above may be so formed that the co-efficient of leakage between the windings of the two impedances, is reduced to a minimum.

When, in the latter case, the third impedance has a value of zero, that is when the other line of the single phase system is directly connected to a third line of the three phase system, the voltage of the single phase system will vary but slightly with the load, assuming the voltage of the polyphase system to be constant.

The impedances which are used in this invention can consist of resistances or reactances, or a combination of both.

The invention is more particularly described with reference to the accompanying diagrammatic drawings, showing different embodiments as applied to a three phase system, and wherein:—

Figure 1 shows one form of the invention.

Figure 2 shows a second form of the invention.

Figure 3 shows a third form of the invention.

Figure 4 shows a fourth form of the invention.

Figure 5 is a vector diagram of the arrangement shown in Figure 1 of the drawing, where $E_a$, $E_b$, and $E_c$ represent the voltage drop in the impedances $I_a$, $I_b$, and $I_c$; and $E_1$ is the voltage on the terminals of the single-phase load. Figure 6 is a vector diagram the same as Figure 5, only the E. M. F. $E_c$ is omitted. This diagram corresponds to Figure 2 of the drawing. The vector diagram of Figure 7 refers to the arrangement shown in Figure 4 of the drawing. The current $I_c$ is taken to be in phase with the voltage of the single-phase load, while the currents $I_a$ and $I_b$ are equal and have half the value of the current $I_c$.

In Figure 1, A, B, and C are the three lines of a three phase system, between the lines A and B is connected a pair of equal impedances which I choose to term a divisor. These impedances are joined together at the point D and between the point D and the line wire C of the third phase, the single phase load is connected, the terminals of the single phase load being indicated in the drawing by $T_1$ and $T_0$. This load may be an impedance or the primary of a transformer, such as shown in Holslag Patent 1,305,363, issued June 3, 1919, or any other desired apparatus, machine or combination of these. As shown in Figure 1, a third impedance $I_c$ is connected between the terminal $T_0$ of the single phase system and line C of the third phase of the three phase system. As previously explained, if the voltage between A, B and C is 220 volts then at the point D of the central part of the divisor the voltage will be 110 and from D to C the voltage will be the vector sum of the two legs, having a value of 110 disposed at 120 degrees or 190 volts. It will thus be seen that by the arrangement shown in Figure 1, the single phase apparatus can be operated between 110 and 190 volts, according to the connections between $T_o$ and the impedance $I_c$, and that the load of the single phase apparatus is distributed on the lines A B and C, A and B bearing half the current and C the full current of the single phase apparatus, and thus the divisor represents an arrangement with a capacity of about 30% of the input of the single phase apparatus, whereas if a transformer is used in the ordinary way, this transformer would require an output of about 115% of the input of the single phase apparatus consequently the application of this invention materially reduces the price and size of the auxiliary apparatus required to operate the single phase machine from the polyphase system.

In practice the divisor may take the form of a transformer or a choke coil having an ordinary closed circuit core, on which the windings A to B are wound with a tap D at the central point.

When it is essential that the point D in the drawing, shall not shift by alteration of the load, the windings AD and BD of the divisor should be so placed that the magnetic leakage between these parts is relatively small, thus they may be placed on the same limb of the core and one winding wound directly over the other, or concentric therewith, as shown in Figure 4, or disc windings with interleaved coils may be used.

In Figure 2 the same arrangement is shown as in Figure 1 above except for the fact that the value of the impedance $I_c$ is reduced to zero, so that the line C is directly connected to the line $T_o$ of the single phase consumer system.

In Figure 3 is shown the same arrangement as in Figure 1 except for the fact that the impedances $I_A$ and $I_B$ are magnetically coupled. The construction of the windings of these impedances is so chosen that the magnetomotive forces of the load current in the two windings are opposed to each other to thus hold each other in balance. In this arrangement the impedance $I_c$ can also have a value of zero in which latter case the voltage drop is due only to the leakage of the two windings of impedances $I_A$ and $I_B$.

In Figure 4 the same arrangement is shown as in Figure 3 except that the windings of the impedances $I_A$ and $I_B$ are arranged on a single core, for example, so that the leakage between these windings is small. In this form also the impedance $I_c$ can have the value zero in which case the single phase system shows but a slight voltage drop from no load to full load, the voltage of the three phase system being assumed constant. The combined impedance $I_A$ and $I_B$ then operate to divide the voltage between the lines A and B.

It is of course obvious that the relative positions of the single phase consumer system and the third impedance $I_c$ can be interchanged according to this invention.

Having described my invention as above, I now claim:

1. A conversion system for operating a single phase apparatus from a polyphase supply system, including a divisor comprising: impedances connected to at least two of the phases of the supply system, and having a common junction point the potential of which to another of the phases of the supply system is higher than the potential from said junction point across said individual impedances, said single phase apparatus, adapted to be connected between said junction point and another of the phases of the supply system.

2. A conversion system for operating a single phase apparatus from a polyphase supply system, including a divisor comprising: impedances connected to at least two of the phases of the supply system, and having a common junction point the potential of which to another of the phases of the supply system is higher than the potential from said junction point across said individual impedances, said single phase apparatus, adapted to be connected between said junction point and another of the phases of the supply system, and means arranged to be connected in series with the single phase apparatus for regulating the input to this apparatus.

3. A conversion system for operating a single phase apparatus from a polyphase supply system, including a divisor comprising impedances connected to at least two of the phases of the supply system and having a common junction point, said single phase apparatus adapted to be connected between said junction point and another of the phases of the supply system, said divisor impedances having a magnetic core and windings arranged thereon so the reaction of one winding on the other is such that said common junction is held substantially at the same place regardless of alterations in the single phase load.

4. A conversion system for operating a single phase apparatus from a polyphase supply system, whereby two of the phases carry at least approximately half the current while another phase carries the full current of the single phase apparatus, including a divisor comprising a pair of impedances having a core and windings magnetically coupled and electrically connected together at one end and their opposite ends to said two phases respectively, said single phase apparatus adapted to be connected between said junction point and another of the phases of the supply system.

5. A conversion system for operating a single phase apparatus from a polyphase supply system, including means for obtaining single phase current for electric arc welding or the like, said current having an initial voltage materially greater than the voltage at the arc, whereby a considerable drop in said voltage results when the welding operation is going on, said means comprising a divisor consisting of a plurality of reactances having a common junction point and their other terminals connected to different phases of the polyphase system, said junction point being one terminal of said initial voltage while another phase of the supply system is the other terminals, said single phase apparatus adapted to be connected between said two last mentioned voltage terminals.

6. An arrangement and apparatus for transforming polyphase alternating current into single phase alternating consumer current consisting in the application of two auxiliary impedances the first auxiliary impedance connecting one line of the polyphase system to one of the terminals of the single phase consumer system, the same terminal of the single phase consumer system being connected by the second auxiliary impedance to a second line of the polyphase system, the other terminal of the single phase consumer system being connected directly to a third line of the polyphase system.

In testimony whereof I have signed my name to this specification.

THOMAS ROSSKOPF.